(12) United States Patent
Liu

(10) Patent No.: US 12,516,438 B2
(45) Date of Patent: Jan. 6, 2026

(54) METHODS OF FABRICATING POROUS SILICON STRUCTURES

(71) Applicant: The Methodist Hospital, Houston, TX (US)

(72) Inventor: Xuewu Liu, Sugar Land, TX (US)

(73) Assignee: The Methodist Hospital, Houston, TX (US)

( * ) Notice: Subject to any disclaimer, the term of this patent is extended or adjusted under 35 U.S.C. 154(b) by 0 days.

(21) Appl. No.: 19/011,225

(22) Filed: Jan. 6, 2025

(65) Prior Publication Data

US 2025/0146158 A1 May 8, 2025

Related U.S. Application Data

(63) Continuation of application No. PCT/US2023/333524, filed on Sep. 22, 2023.

(60) Provisional application No. 63/409,601, filed on Sep. 23, 2022.

(51) Int. Cl.
*C25F 3/12* (2006.01)
*B81C 1/00* (2006.01)

(52) U.S. Cl.
CPC ............ *C25F 3/12* (2013.01); *B81C 1/00119* (2013.01); *B81C 1/00531* (2013.01)

(58) Field of Classification Search
None
See application file for complete search history.

(56) References Cited

U.S. PATENT DOCUMENTS

| | | | |
|---|---|---|---|
| 8,920,625 B2 | 12/2014 | Ferrari et al. | |
| 10,253,424 B2 | 4/2019 | Ferrari et al. | |
| 10,842,749 B2 | 11/2020 | Shen et al. | |
| 2008/0280140 A1* | 11/2008 | Ferrari ..................... | C25F 3/12 205/640 |
| 2013/0056698 A1 | 3/2013 | Satoh et al. | |
| 2013/0195963 A1 | 8/2013 | Serda et al. | |
| 2016/0369269 A1 | 12/2016 | Shen et al. | |
| 2017/0184576 A1 | 6/2017 | Tinto et al. | |

OTHER PUBLICATIONS

T. Sugaya, D. H. Yoon, H. Yamazaki, K. Nakanishi, T. Sekiguchi and S. Shoji, "Simple and Rapid Fabrication Process of Porous Silicon Surface Using Inductively Coupled Plasma Reactive Ion Etching," in Journal of Microelectromechanical Systems, vol. 29, No. 1, pp. 62-67, Feb. 2020, (Year: 2020).*
Chiappini et al. "Mesoporous silicon particles as intravascular drug delivery vectors: fabrication, in-vitro, and in-vivo assessments," Phys. Status Solidi C, 1-7 (2010) / DOI 10.1002/pssc.201000344.
International Search Report and Written Opinion for Application No. PCT/US23/33524, dated Jan. 8, 2024, 11 pages.

* cited by examiner

*Primary Examiner* — Louis J Rufo
(74) *Attorney, Agent, or Firm* — William Childs; Childs Patent Law PLLC

(57) ABSTRACT

The present disclosure provides methods of manufacturing porous silicon structures having controlled sizes, shapes, and porosity by using a series of protective layers and selective etching steps. A benefit of the methods disclosed herein can be providing microfabrication and nanofabrication methods that are capable of provide porous silicon structures having sizes, shapes, and porosity that are more tightly controlled by avoiding inadvertently etching parts of the silicon structures during the fabrication process.

18 Claims, 5 Drawing Sheets

METHODS OF FABRICATING POROUS SILICON STRUCTURES

CROSS-REFERENCE TO RELATED APPLICATIONS

This application is a continuation and claims priority to PCT Application No. PCT/US23/33524, filed on Sep. 22, 2023, which claims priority to U.S. Provisional Application No. 63/409,601, filed on Sep. 23, 2022, the entirety of which are incorporated by reference.

GOVERNMENT SUPPORT

This invention was made with Government support under W81XWH-12-1-0414 and W81XWH-17-1-0389 awarded by the Department of Defense; and U54CA151668 awarded by the National Institutes of Health. The Government has certain rights in the invention.

TECHNICAL FIELD

The present disclosure relates generally to the field of microfabrication and nanofabrication of porous silicon structures for applications in micromedicine and nanomedicine, such as drug delivery.

BACKGROUND

In the field of micromedicine and nanomedicine, particles can be designed to avoid the limitations of traditional drug delivery. For example, porous silicon particles and porous silica particles have a number of applications including, being used as drug delivery carriers. These particles are the subject of inventive research thanks to their biocompatibility, biodegradability, ease of fabrication, tunable nanostructure, and porous network. For example, porous silicon particles and methods of their making are disclosed in the following documents: U.S. Pat. Nos. 10,253,424; 6,355,270 and 6,107,102; US Patent Publication No. 2006/0251562; Chiappini et al., Phys. Status Solidi, C, Current Topics in Solid State Physics, 8 (6), 1826-1832 (2010); Cohen et al., Biomedical Microdevices 5:3, 253-259 (2003); Meade et al., Advanced Materials, 16 (20), 1811-1814 (2004); Thomas et al., Lab Chip, 6, 782-787 (2006); Meade et al., phys. stat. sol. (RRL) 1 (2), R71-R-73 (2007); Salonen et al., Journal of Pharmaceutical Sciences 97 (2), 632-653 (2008); Salonen et al., Journal of Controlled Release 108, 362-374 (2005). However, the development of porous silicon particles for applications in nanomedicine is only as good as the ability to control size, shape, and porosity.

To date, traditional microfabrication methods suffer from several limitations including that the obtained porous silicon structures are deformed in their shape and size.

There is a need to develop new and improved methods of preparation of porous silicon structures that may avoid or reduce accidental deformation or loss of control during fabrication.

SUMMARY

The present disclosure provides methods of manufacturing porous silicon structures. In some embodiments, the method of manufacturing porous silicon structures comprises: providing a silicon substrate having a silicon surface; forming a first protective layer on the silicon surface, wherein the first protective layer has a protective layer surface; depositing a second protective layer on the protective layer surface; forming protected areas and non-protected areas on the first protective layer surface by patterning the second protective layer; forming first protective layer pillars by performing a first etch of the non-protected areas of the first protective layer; forming silicon pillars by performing a second etch of the silicon substrate, wherein the silicon pillars are located beneath the first protective layer pillars, wherein the silicon pillars have a silicon pillar top, a silicon pillar sidewall, a silicon pillar height, and a silicon pillar width, and wherein adjacent silicon pillar sidewalls are separated by silicon trenches having a silicon pillar spacing; covering the first protective layer pillars, the silicon pillar sidewalls, and the silicon trenches by depositing a dielectric layer; patterning the dielectric layer by removing a portion of the dielectric layer from a top of the protective layer pillars by exposing the dielectric layer to a third etch; and removing the protective layer pillars by exposing the protective layer pillars to a fourth etch.

In some embodiments, the silicon surface comprises boron. In some embodiments, the first protective layer comprises silicon oxide, aluminum oxide, chromium, nickel, copper, or any combination thereof. In some embodiments, the second protective layer comprises a photoresist. In some embodiments, the dielectric layer comprises silicon nitride.

In some embodiments, the first protective pillars have a protective pillar width of from about 200 nm to about 5.0 micrometers and a protective pillar height of from about 100 nm to about 600 nm. In some embodiments, the first protective pillars have a protective pillar width of from about 600 nm to about 4.0 micrometers and a protective pillar height of from about 150 nm to about 500 nm.

In some embodiments, the silicon pillar height is from about 2.0 micrometers to about 50.0 micrometers, the silicon pillar width is from about 200 nm to about 5.0 micrometers and the silicon pillar spacing is from about 200 nm to about 1000 nm. In some embodiments, the silicon pillar height is from about 6.0 micrometers to about 15.0 micrometers, the silicon pillar width is from about 600 nm to about 4.0 micrometers, and the silicon pillar spacing is from about 300 nm to about 800 nm.

In some embodiments, a ratio of the silicon pillar height to silicon pillar spacing is from about 60:1 to about 20:1. In some embodiments, ratio of the silicon pillar height to silicon pillar spacing is from about 55:1 to about 45:1.

In some embodiments, the method further comprises forming porous silicon pillars by applying a current to the silicon substrate. In some embodiments, the method further comprises forming porous silicon pillars by applying a current to the silicon substrate through a solution in an electrolytic cell, the current having a current density of about 1 mA/cm$^2$ to about 50 mA/cm$^2$.

In some embodiments, the method further comprises forming porous silicon structures by removing the dielectric layer. In some embodiments, the method further comprises forming porous silicon structures and separating the porous silicon structures from the silicon substrate by applying a current to the silicon substrate. In some embodiments, the current having a current density ranging from about 100 mA/cm$^2$ to about 200 mA/cm$^2$ is applied to the silicon substrate while the silicon substrate is submerged in a fifth etch solution comprising HF.

In some embodiments, the first protective layer comprises silicon oxide and the first etch includes reactive ion etching under an atmosphere of $CF_4$ and/or $CHF_3$, or exposing the non-protected areas of the first protective layer to a first etching solution comprising HF, $NH_4HF$, NaF, KF, or any combination or mixture thereof. In some embodiments, the first protective layer comprises aluminum oxide and the first etch includes exposing the non-protected areas of the first protective layer to a first etching solution comprising HF, $NH_4OH$, tetra-methylammonium hydroxide, $H_3PO$, $Br_2$, or any combination or mixture thereof. In some embodiments, the first protective layer comprises chromium and the first etch includes exposing the non-protected areas of the first protective layer to a first etching solution comprising $H_2O_2$, HCl, $H_2SO_4$ and $H_2O_2$, or any combination or mixture thereof. In some embodiments, the first protective layer comprises nickel and the first etch includes exposing the non-protected areas of the first protective layer to a first etching solution comprising $HNO_3$, $FeCl_3$, $Ce(NH_4)_2(NO_3)_6$, HF and $H_2O_2$, $H_3PO_4$, or any combination or mixture thereof. In some embodiments, the first protective layer comprises copper and the first etch includes exposing the non-protected areas of the first protective layer to a first etching solution comprising $HNO_3$, $FeCl_3$, KCN, $H_2O_2$, or any combination or mixture thereof.

In some embodiments, the second etch comprises reactive ion etching. In some embodiments, the second etch comprises reactive ion etching under an atmosphere of $SF_6$. In some embodiments, the second etch comprises inductively coupled plasma reactive ion etching. In some embodiments, the second etch comprises inductively coupled plasma reactive ion etching under an atmosphere of $SF_6$.

In some embodiments, the third etch comprises reactive ion etching. In some embodiments, the third etch comprises reactive ion etching under an atmosphere of $CF_4$, $CHF_3$, or $SF_6$.

In some embodiments, the fourth etch includes exposing the first protective layer pillars to a fourth etching solution. In some embodiments, the first protective layer pillars comprise silicon oxide and the fourth etch solution comprises HF, $NH_4HF$, NaF, KF, or any combination or mixture thereof. In some embodiments, the first protective layer pillars comprise aluminum oxide and the fourth etch solution comprises HF, $NH_4OH$, $H_3PO$, $Br_2$, or any combination or mixture thereof. In some embodiments, the first protective layer pillars comprise chromium and the fourth etch solution comprises NaOH, $H_2O_2$, HCl, or any combination or mixture thereof. In some embodiments, the first protective layer pillars comprise nickel and the fourth etch solution comprises $HNO_3$, $FeCl_3$, $Ce(NH_4)_2(NO_3)_6$, HF, $H_3PO_4$, or any combination or mixture thereof. In some embodiments, the first protective layer pillars comprise copper and the fourth etch solution comprises $HNO_3$, $FeCl_3$, KCN, $H_2O_2$, or any combination or mixture thereof. In some embodiments, the first etching solution and the second etching solution are the same or different.

In some embodiments, the porous silicon structures have a first face, second face, and a side, wherein at least one of the first face and the second face are planar or flat. In some embodiments, the porous silicon structures have a first face, second face, and a side, wherein at least one of the first face or the second face has a longest face measurement across the first face or the second face of about 500 nm to about 5.0 micrometers, or the side has a longest side measurement across the side of about 100 nm to about 800 nm or any combination thereof.

In some embodiments, from about 30% to 100% of the porous silicon structures in a sample are characterized as have a first face, second face, and a side, wherein at least one of the first face and the second face are planar or flat. In some embodiments, from about 30% to 100% of the porous silicon structures in a sample are characterized as having a first face, second face, and a side, wherein at least one of the first face or the second face has a longest face average measurement across the first face or the second face of about 500 nm to about 5.0 micrometers, or the side has a longest side average measurement across the side of about 100 nm to about 800 nm or any combination thereof.

In some embodiments, the first protective layer is deposited by chemical vapor deposition, physical vapor deposition, vacuum evaporation, sputtering or heating the silicon substrate to a temperature of from about 800° C. to about 1,200° C. In some embodiments, the second protective layer is deposited by spin-coating or spraying. In some embodiments, the dielectric layer is deposited by chemical vapor deposition.

BRIEF DESCRIPTION OF THE DRAWINGS

The foregoing summary, as well as the following detailed description of the embodiments, will be better understood when read in conjunction with the attached drawings. For the purpose of illustration, there are shown in the drawings some embodiments, which may be preferable. It should be understood that the embodiments depicted are not limited to the precise details shown. Unless otherwise noted, the drawings are not to scale.

DETAILED DESCRIPTION

Figure 1:
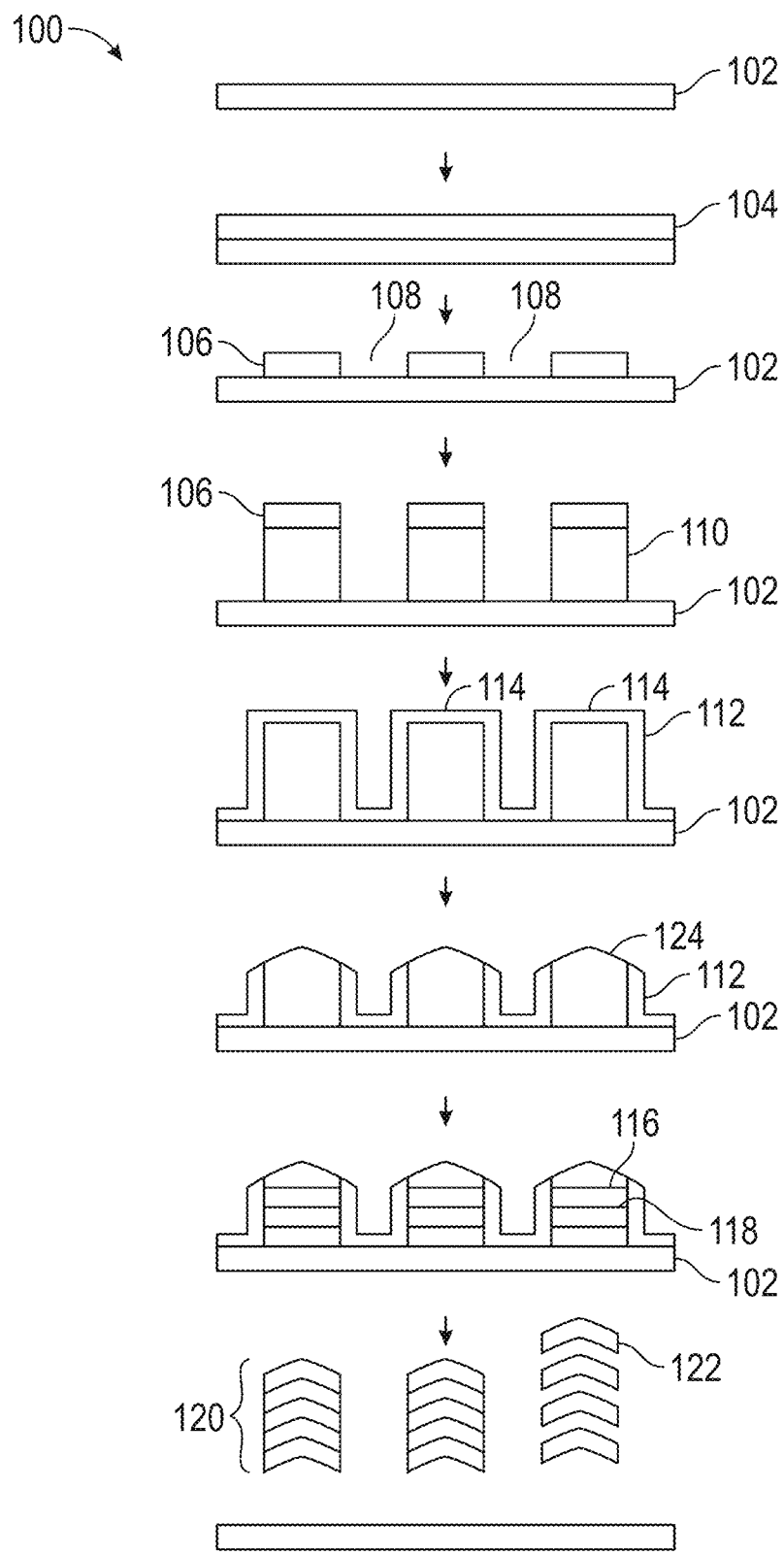
FIG. 1 schematically illustrates a conventional method of fabricating porous silicon structures.

Unless otherwise noted, all measurements are in standard metric units.

Unless otherwise noted, all instances of the words "a," "an," or "the" can refer to one or more than one of the word that they modify.

Unless otherwise noted, the phrase "at least one of" means one or more than one of an object. For example, "at least one of the first face and the second face are flat" means a single first face is flat, two or more first faces are flat, one second face is flat, two or more second faces are flat, or any combination thereof.

Unless otherwise noted, the term "about" refers to +10% of the non-percentage number that is described, rounded to the nearest number to the accuracy shown. For example, about 105.3 mm, would include 94.8 to 115.8 mm. Unless otherwise noted, the term "about" refers to +5% of a percentage number. For example, about 20% would include 15 to 25%. When the term "about" is discussed in terms of a range, then the term refers to the appropriate amount less than the lower limit and more than the upper limit. For example, from about 100 mm to about 200 mm would include from 90 mm to 220 mm.

Unless otherwise noted, when a range of numbers refers to numbers that are easily and routinely varied in a laboratory setting, such as weight, mass, concentration, temperature, charge density, or pressure, then the range of numbers or measurements includes all numbers in that range. For example, the range of 100 mA/cm$^2$ to about 200 mA/cm$^2$ includes 105, 110, 120, 130, 140, 150, 160, 170, 180, 190 and any sub range/number therein.

Unless otherwise noted, the term "for example" or "e.g.," as used herein, is used merely by way of example, and should not be construed as limiting the present disclosure to only those items explicitly referred to in the specification.

Unless otherwise noted, the term "microparticle" means a particle having a maximum characteristic size of less than 1000 microns and a minimum characteristic size of greater than 50 nm.

Unless otherwise noted, "micron" means "micrometer" and the term "microns" means "micrometers." These terms are interchangeable.

Unless otherwise noted, "nanoporous" or "nanopores" refer to pores with an average size of less than 1 micron.

Unless otherwise noted, "Biodegradable" refers to a material that can dissolve or degrade in a physiological medium or a biocompatible polymeric material that can be degraded under physiological conditions by physiological enzymes and/or chemical conditions.

Unless otherwise noted, "Structures" refers to particles having a maximum characteristic size of less than about 1000 microns, or less than about 100 microns, preferably less than about 10 microns. The porous silicon structures of the present disclosure should have a relatively high porosity to enable loading of the active agent in the pores of the porous silicon structures.

Unless otherwise noted, all reactions, procedures, and formulations were or can be performed under normal temperature and pressure, namely 20° C. and 1 atmosphere.

Unless otherwise notes, all elements can be abbreviated using their atomic symbol, e.g., platinum can be shown at Pt.

Unless otherwise noted, the terms "provide", "provided" or "providing" refer to the supply, production, purchase, manufacture, assembly, formation, selection, configuration, conversion, introduction, addition, or incorporation of any element, amount, component, reagent, quantity, measurement, or analysis of any method or system of any embodiment herein.

Unless otherwise noted, properties (height, width, length, ratio etc.) as described herein are understood to be averaged measurements.

Conventional methods of preparing porous silicon structures use conventional microfabrication methods to produce the porous microstructures from crystalline silicon wafers, which are silicon wafers used throughout the semiconductor industry. In practice, the final step of the conventional method of producing the porous microstructures is to form nanopores and to detach the porous microstructures from the silicon wafer by applying a strong current in an HF solution.

However, as will be explained in more detail below, it has been discovered that during this final step of producing the porous microstructures from silicon wafers, namely the application of current in an HF bath, the silicon microstructures formation processes are highly sensitive to imperfections in the shape of the pillars the microstructures are produced from, such that even slight defects in shape, surface, or edges of the pillars can result in unintentional deformation of the porous microstructures produced. These defects in size and shape in turn can severely limit the utility of the porous microstructures as drug delivery vehicles.

In more detail, conventional methods of preparation of porous silicon structures suffer from several limitations including that—the porous silicon structures obtained by following such conventional methods are deformed in their shape and size. As illustrated in FIG. 1, such conventional methods of fabrication 100 include obtaining a silicon substrate 102, such as a silicon wafer, and depositing a protective layer 104, such as a photoresist. The protective layer 104 can be patterned, using traditional photolithography, to provide protected areas 106 that cover the underlying silicon substrate and unprotected areas 108 that expose the silicon substrate for further processing. Theoretically, the unprotected areas can be safely etched using anisotropic or direction selective etching techniques, such as reactive ion etching (RIE), without etching the protected areas. In FIG. 1, an anisotropic etching technique is applied to the nonprotected areas 108 of the silicon substrate 102 to form silicon pillars 110 underneath the protected areas 106 of the protective layer 104. The protective layer 104 on the top of the silicon pillars 110 can then be removed by applying an appropriate stripping treatment, such as, dissolving the photoresist using a compatible solvent. Then, a dielectric layer 112, such as silicon nitride, can be added across the entire surface of the substrate, coating the silicon pillars 110 and the spaces between them 114.

Ideally, the dielectric layer 112 could be carefully etched using reactive ion etching (RIE) with inductively coupled plasma to selectively remove the dielectric material covering the top of the silicon pillars while leaving dielectric material coving the pillar side walls and spaces between the pillars. This step, if successful, would leave the dielectric layer connected across the surface of the silicon substrate and surrounding each silicon pillar. Then, electrochemical etching can be performed using a mixture of hydrofluoric acid (HF) and ethanol (3:7 v/v) with an applied current density of 80 mA/cm$^2$ for 25 seconds to form a first porous layer 116 and the second porous layer 118, and more as needed. Once the desired size, shape, and density of pores are produced, then a higher current density can be applied that widens the porous bands until the silicon microstructures are capable of being separated from one another. Finally, the dielectric material can be removed, using a suitable or compatible stripping agent, e.g., hot phosphoric acid for silicon nitride, allowing for the complete detachment and separation of the silicon pillar into a group porous silicon microstructure 120 for further processing or even smaller, separate porous microstructures 122.

Figure 4A:
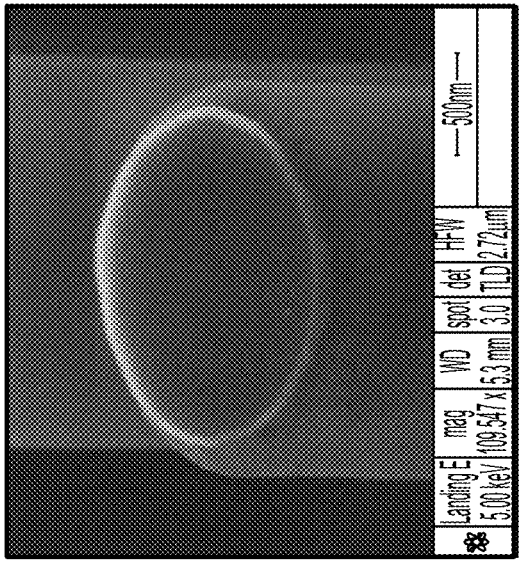
FIGS. 4A-D show exemplary Scanning Electron Microscope (SEM) images of silicon pillars and porous silicon structures having deformed shapes and sizes, which are prepared in accordance with the conventional method, as illustrated in FIG. 1.
Figure 4B:
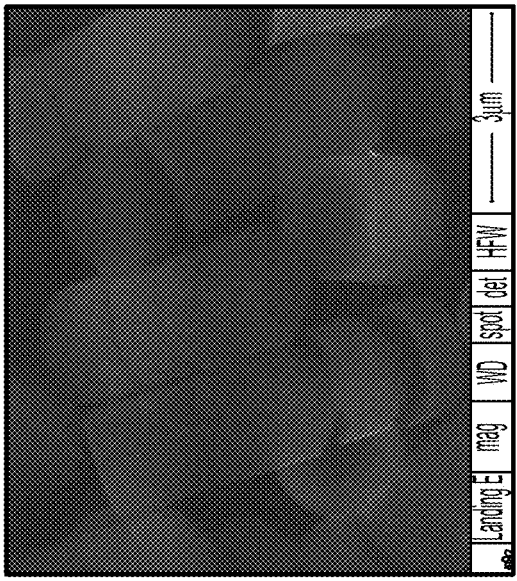
Figure 4C:
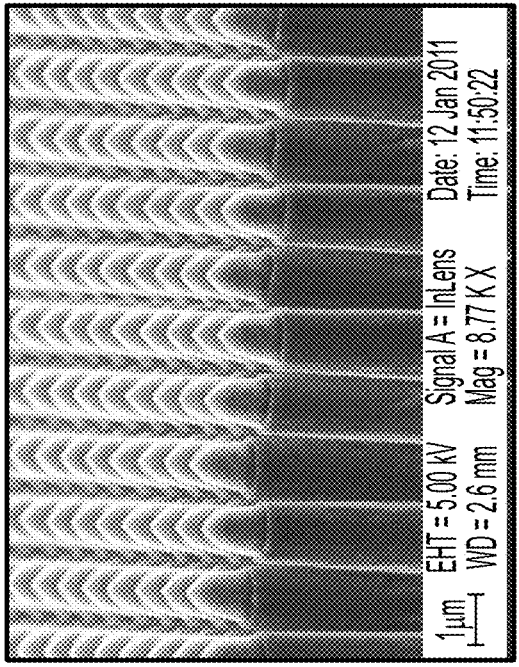
Figure 4D:
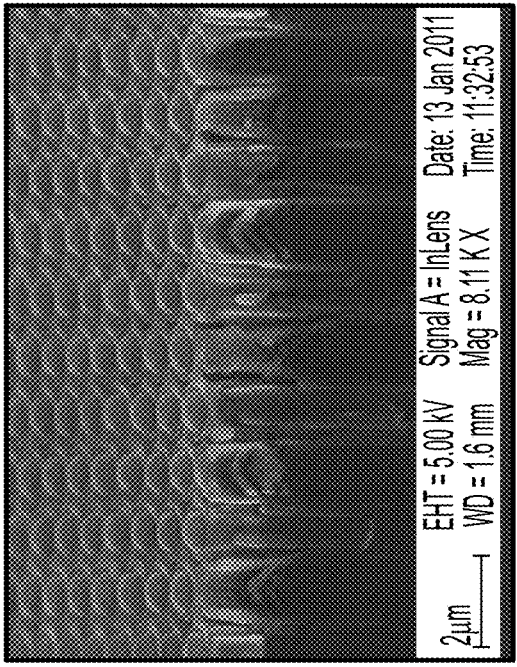

However, referring to FIG. 1, it has been discovered that that during the removal of protecting layer 104 and/or during the removal of dielectric layer 112, the top face or top surface of the silicon pillars 104 becomes distorted during the RIE etching. In particular, the edges of the tops of the silicon pillars 124 becomes rounded instead of staying sharp. This defect in the tops of the pillars results in the propagation of the defect into the silicon microstructures being formed because the application of the electrical current forms deformed bands of pores through the silicon pillars. FIG. 4A shows a Scanning Electron Microscope (SEM) image of silicon pillars covered by a first protective layer, namely a photoresist. It can be seen that the photoresist is thicker in the middle of each pillar and thinner towards the sides. Once the RIE etching is performed and the photoresist is removed, then the silicon pillar tops have a deformed, rounded edge as shown in FIG. 4B. It has been discovered this tiny defect, this defective rounded edge in the shape of the rounded tops propagates into severely deformed bands of pores formed in the silicon pillars (shown in FIG. 4C). These deformed bands of pores produce deformed silicon microstructures as shown in FIG. 4D. Such deformations may seem small and insignificant, however, these deformed shapes present a top edge or spike that render them unusable for drug delivery because the top edge or spike could cause the microstructures to aggregate inside blood vessels or to damage blood vessels by cutting them.

Methods are disclosed herein which solve the above-mentioned problems associated with the conventional methods by providing a sequence of adding and removing protective layers to provide porous silicon structures without any deformation in their shapes, sizes, and structures.

Figure 2:
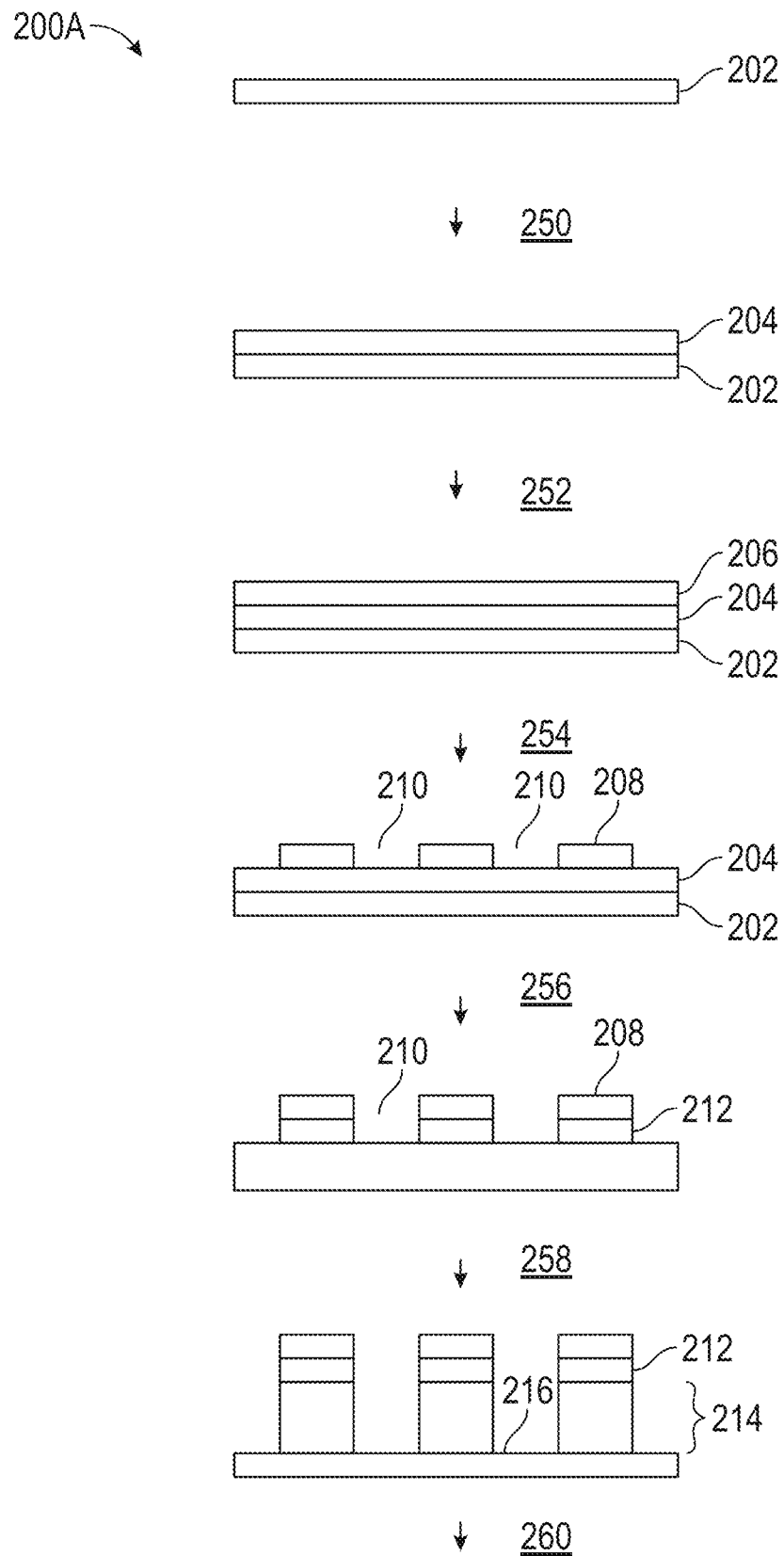
FIG. 2 schematically illustrates part of an embodiment of a method of making porous microstructures, in accordance with the present disclosure.

Referring to FIG. 2, in an embodiment of the method disclosed herein, the method of fabrication 200A includes obtaining a silicon substrate 202. A first protective layer 204 comprising silicone dioxide is deposited in a depositing step 250 on the silicon surface (top) of the silicon substrate 202. A second protective layer 206 is then deposited in a second depositing step 252 on the protective layer surface (top) of the first protective layer 204. The second protective layer 206 can be a photoresist. The second protective layer 206 is then patterned during a patterning step 254 to form protected areas 208 and non-protected areas 210 on the protective layer surface of the first protective layer 202 using traditional photolithography, providing defining shapes and dimensions of the silicon structures to fabricated.

A first etching step 256 is performed on the non-protected areas 210 of the first protective layer 204 to form first protective layer pillars 212 underneath the protected areas 208. The first etching step 256 uses an etchant that is compatible with the choice of material for the first protective layer. For example, when the first protective layer is silicon oxide, then a first etching step can be performed by reactive ion etching under an atmosphere of $CF_4$ and/or $CHF_3$, or contacting the first protective layer with a solution comprising HF, $NH_4HF$, NaF, KF, or any combination or mixture thereof.

A second etching step 258 is then performed on the silicon substrate in the exposed non-protected areas 210 to form silicon pillars 214 beneath the first protective layer pillars 212. Before or after the second etching step, the second protective layer 206 on the top of first protective layer pillars 212 can be removed in a removal step 260 by applying an appropriate treatment for removing the protective layer. In this example, where the second protective layer is a photo-resist, then a solvent or developing agent provided by the photoresist manufacturer can be used to remove the second protective layer.

Figure 3:
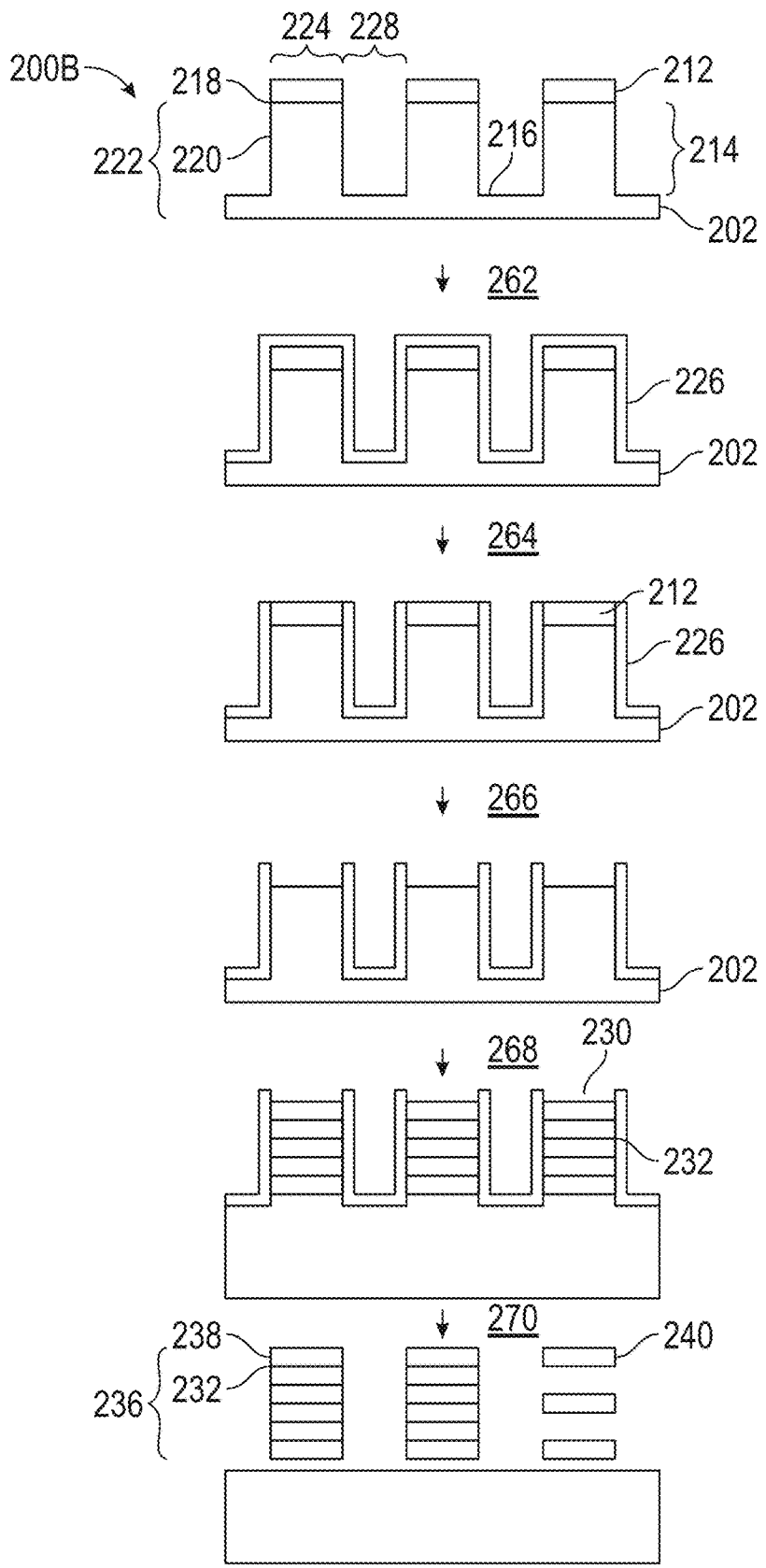
FIG. 3 continues and concludes showing the embodiment of a method of making porous microstructures presented in FIG. 2.

Referring to FIG. 3, an embodiment of the method disclosed herein 200B is shown that continues the method 200A shown in FIG. 2. As illustrated in FIG. 3, the silicon pillars 214 are located beneath the first protective layer pillars 212 and have a silicon pillar top 218, a silicon pillar sidewall 220, a silicon pillar height 222, and a silicon pillar width 224. Also, adjacent silicon pillar sidewalls are separated by silicon trenches 216 having a silicon pillar spacing 228.

As illustrated in FIG. 3, a dielectric layer 226 is deposited in a depositing step 262 over the first protective layer pillars 212, the silicon pillar sidewalls 220, and the silicon trenches 216. The dielectric layer 226 includes a material that can conduct and direct a current through the silicon pillars, for example, silicon nitride. In a third etching step 264, the dielectric layer 226 is removed from a top of the first protective layer pillars 212 by exposing the dielectric layer 226 to a selective etching step, for example, by reactive ion etching (RIE) with inductively coupled plasma. After removal of the dielectric layer from the top of the first protective layer pillars, the dielectric layer 226 remains intact and covers the silicon pillar sidewalls 220 and the silicon trenches 216. The first protective layer pillars 212 are then removed by exposing the first protective layer pillars 212 to etching (fourth etching step 266). The fourth etch should also be compatible with the type of material used for the first protective layer. In this example, the first protective layer is silicon dioxide, so a compatible etching medium such as an HF bath is used to selectively remove the first protective layer pillars without removing the silicon nitride layer.

Thereafter, a current (for example, a DC current) is applied to the silicon substrate 202 in a pore formation step 268, through a solution in an electrolytic cell to obtain porous silicon pillars 230, said porous silicon pillars comprising bands of horizontal nanopores 232 therein. The applied DC current may be selected to have a current density so to form pores of desired size, for example, a current density of about 1 $mA/cm^2$ to about 50 $mA/cm^2$. The porous silicon pillars 230 are then subjected to a current having higher current density, for example, a current density from about 100 $mA/cm^2$ to about 200 $mA/cm^2$ to form a porous silicon structure, while the silicon substrate is submerged in an etching solution, for example, HF. The steps of application of a current of lower current density and application of a current of higher current density can be repeated for a desired number of times to form a periodical layered or a stacked porous silicon structure 236 that includes a plurality of first porous layers 238 (i.e., porous silicon structures) separated by second porous layers 232 or separate porous silicon microstructures 240.

In a dielectric layer removal step 270, the porous silicon structures 236 can be released into a solution by removing the dielectric layer that was holding them on the surface of the silicon substrate. Dielectric layer removal step 270 or releasing step can be aided by mechanical means, such as by exposing the silicon substrate 202 with the stacks to ultrasonic vibrations.

Figure 5A:
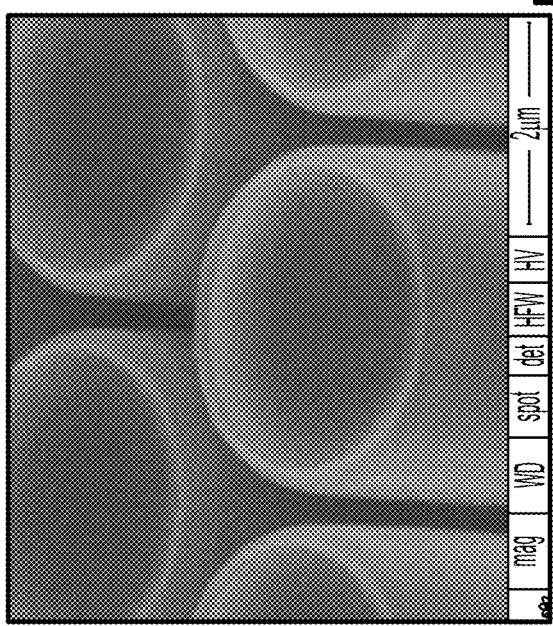
FIGS. 5A-D show exemplary SEM images of silicon pillars and porous silicon structures having controlled shapes, which are prepared in accordance with embodiments of methods in the present disclosure.
Figure 5B:
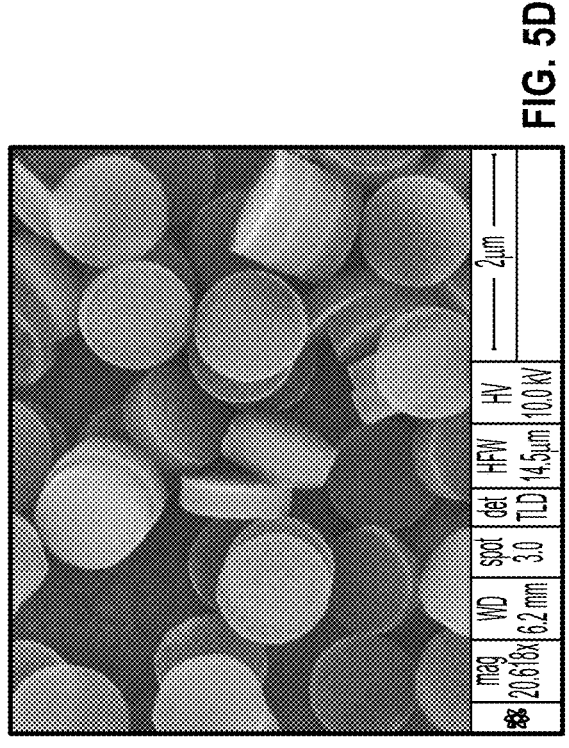
Figure 5C:
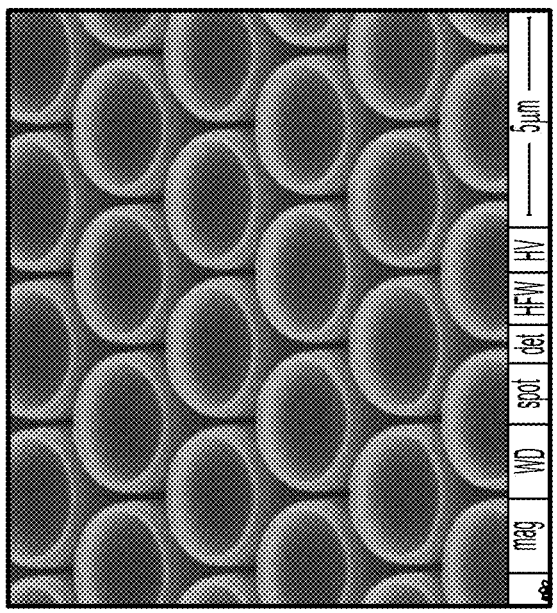
Figure 5D:
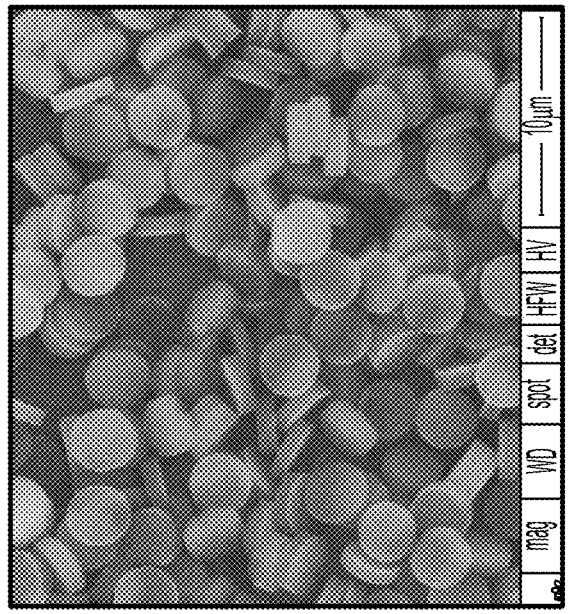

FIGS. 5A-D illustrate exemplary SEM images of silicon pillars and porous silicon structures having defined shapes (flat or planar top and flat or planar bottom surfaces) and sizes, prepared in accordance with the method of the present disclosure. As can be seen in FIGS. 5A and 5B, the tops of the silicon pillars are adequately protected by the first protected layer. This difference in the shape and surface of the tops of the pillars, when subjected to the pore forming steps, produces porous silicon structures having a flat or planar top and flat or planar bottom surfaces, and are regular in size, as shown in FIG. 5C and FIG. 5D.

The present disclosure provides method of manufacturing porous silicon structures. In some embodiments, the method of manufacturing porous silicon structures comprises: providing a silicon substrate having a silicon surface. In some embodiments, the method of manufacturing porous silicon structures comprises: forming a first protective layer on the silicon surface, wherein the first protective layer has a protective layer surface. In some embodiments, the method of manufacturing porous silicon structures comprises: depositing a second protective layer on the protective layer surface. In some embodiments, the method of manufacturing porous silicon structures comprises: forming protected areas and non-protected areas on the first protective layer surface by patterning the second protective layer. In some embodiments, the method of manufacturing porous silicon structures comprises: forming first protective layer pillars by performing a first etch of the non-protected areas of the first protective layer. In some embodiments, the method of manufacturing porous silicon structures comprises: forming silicon pillars by performing a second etch of the silicon substrate, wherein the silicon pillars are located beneath the first protective layer pillars, wherein the silicon pillars have a silicon pillar top, a silicon pillar sidewall, a silicon pillar height, and a silicon pillar width, and wherein adjacent silicon pillar sidewalls are separated by silicon trenches having a silicon pillar spacing. In some embodiments, the method of manufacturing porous silicon structures comprises: covering the first protective layer pillars, the silicon pillar sidewalls, and the silicon trenches by depositing a dielectric layer. In some embodiments, the method of manufacturing porous silicon structures comprises: patterning the dielectric layer by removing a portion of the dielectric layer from a top of the protective layer pillars by exposing the dielectric layer to a third etch. In some embodiments, the method of manufacturing porous silicon structures comprises: removing the protective layer pillars by exposing the protective layer pillars to a fourth etch.

In some embodiments, the method the silicon substrate has at least one planar surface (usually a polished side of the silicon surface) on which one or more layers can be patterned. In some embodiments, the substrate is a crystalline substrate, for example, a wafer. In certain embodiments, the substrate may be a semiconducting substrate, i.e., a substrate comprising one or more semiconducting materials like silicon. In some embodiments, the surface of the substrate may be optionally roughened by a treatment, such as by KOH dipping or reactive ion etching (RIE). In some embodiments, the roughening of the surface may help in removing or preventing the formation of the nucleation layer on the surface. In some embodiments, the silicon substrate can be etched by a wet etching technique, such as electrochemical etching. In some embodiments, properties of the substrate, such as doping level, resistivity, and a crystalline orientation of the surface, can be selected to obtain desired properties of pores. In some embodiments, the substrate can be a heavily doped p++ type wafer with resistivity ranging from about 0.003 ohm-cm to about 0.007 ohm-cm. In some embodiments, the silicon surface comprises boron.

In some embodiments, the first protective layer comprises silicon oxide, aluminum oxide, chromium, nickel, copper, or any combination thereof. In some embodiments, the second protective layer comprises a photoresist. In some embodiments, the dielectric layer comprises silicon nitride.

In some embodiments, the first protective pillars have a protective pillar width of from about 200 nm to about 5.0 micrometers. In some embodiments, the first protective pillars have a protective pillar width of from about 300 nm to about 4.8 micrometers, including from about 400 nm to about 4.6 micrometers, including from about 500 nm to about 4.4 micrometers, including from about 550 nm to about 4.2 micrometers, or from about 600 nm to about 4.2 micrometers. In some embodiments, the first protective pillars have a protective pillar width of from about 600 nm to about 4.0 micrometers.

In some embodiments, the first protective pillars have a protective pillar height of from about 100 nm to about 600 nm. In some embodiments, the first protective pillars have a protective pillar height of from about 120 nm to about 550 nm, including from about 140 nm to about 520 nm, including from about 180 nm to about 450 nm, or including from about 200 nm to about 400 nm. In some embodiments, the first protective pillars have a protective pillar height of from about 150 nm to about 500 nm.

In some embodiments, the silicon pillar height is from about 2.0 micrometers to about 50.0 micrometers. In some embodiments, the silicon pillar height is from about 3.0 micrometers to about 45.0 micrometers, including from about 4.0 micrometers to about 40.0 micrometers, including from about 4.0 micrometers to about 35.0 micrometers, or including from about 5.0 micrometers to about 25.0 micrometers. In some embodiments, the silicon pillar height is from about 6.0 micrometers to about 15.0 micrometers.

In some embodiments, the silicon pillar width is from about 200 nm to about 5.0 micrometers. In some embodiments, the silicon pillar width is from about 300 nm to about 4.8 micrometers, including from about 400 nm to about 4.6 micrometers, from about 500 nm to about 4.4 micrometers, including from about 550 nm to about 4.2 micrometers, or including from about 600 nm to about 4.2 micrometers. In some embodiments, the silicon pillar width is from about 600 nm to about 4.0 micrometers.

In some embodiments, the silicon pillar spacing is from about 200 nm to about 1000 nm. In some embodiments, the silicon pillar spacing is from about 220 nm to about 980 nm, including from about 230 nm to about 950 nm, from about 250 nm to about 900 nm, from about 270 nm to about 880 nm, or from about 290 nm to about 850 nm. In some embodiments, the silicon pillar spacing is from about 300 nm to about 800 nm. Silicon pillar spacing it is significant because it controls the ability of the dielectric layer to form an even coating between the silicon pillars for the eventual pore formation step. If the silicon pillar spacing falls below about 200 nanometers, then the dielectric layer becomes uneven producing uncontrollable pore sizes and deformation of the silicon structures. If the silicon pillar spacing passes above 1000 nanometers, then the number of microstructures produced for the amount of work put in becomes too poor to be practical.

In some embodiments, ratio of the silicon pillar height to silicon pillar spacing is from about 60:1 to about 20:1. In some embodiments, ratio of the silicon pillar height to silicon pillar spacing is from about 55:1 to about 45:1. In some embodiments, ratio of the silicon pillar height to silicon pillar spacing is from about 55:1 to about 25:1, including from about 52:1 to about 48:1, from about 50:1 to about 30:1, or from about 45:1 to about 35:1. A benefit of ratio of the silicon pillar height to silicon pillar spacing can be controlling the number of particles formed per area of silicon substrate with higher aspect ratios providing more porous silicon structures per unit of area. Also, this ratio is significant because it controls the ability of the dielectric layer to form an even coating between the silicon pillars for the eventual pore formation step. If the ratio of the silicon pillar height to silicon pillar spacing passes above 60:1, then then the dielectric layer becomes uneven producing uncontrollable pore sizes and deformation of the silicon structures. If the silicon ratio of the silicon pillar height to silicon pillar spacing passes below 20:1, then then the number of microstructures produced for the amount of work put in becomes too poor to be practical.

Formation of porous silicon pillars or porous silicon structures comprising various porous layers can be formed on the substrate using a number of techniques. In some embodiments of the method, the porous layer is formed using a wet etching technique, i.e., by exposing the substrate to an etching solution that includes at least one etchant, such as a strong acid. In some embodiments of the method, the formation of the porous layer is performed using an electrochemical etching process, during which an etching electric current is run through the substrate. Electrochemical etching of silicon substrates to form porous silicon layers is detailed, for example, in U.S. Pat. No. 8,920,625. In some embodiments, the method includes electrochemical etching of silicon substrates using an etching solution that includes, in addition to HF, water and/or ethanol.

In some embodiments, during the electrochemical etching process, the silicon substrate acts as one of the electrodes. For example, during the electrochemical etching of silicon, the silicon substrate may act as an anode, while a cathode may be an inert metal, such as Platinum (Pt). In such a case, a porous layer is formed on a side of the silicon substrate facing away from the inert metal cathode. Yet in some other embodiments, during the electrochemical etching, the silicon substrate can be placed between two electrodes, which each may comprise an inert metal or a noble metal.

In some embodiments of the method, the electrochemical etching process may be performed in a reactor or a cell resistant to the etchant. For example, when the etchant is HF, the electrochemical etching process may be performed in a reactor or a cell comprising an HF-resistant material. Examples of HF-resistant materials include fluoropolymers, such as polytetrafluoroethylene (PTFE). In some embodiments of the method, the electrochemical etching may be performed by monitoring a current at one of the electrodes, e.g., by monitoring anodic current (galvanostatically) or voltage (potentiostatically). In some embodiments, it may be preferable to perform electrochemical etching at a constant current density, which may allow for a better control of the formed porous layer properties and/or for a better reproducibility from sample to sample.

In some embodiments, if the formation of two different stable porous regions are desired, two different constant currents may be applied. For example, a first current density can be applied to form a first porous layer and then a second current density may be applied to form a second porous layer, which may differ from the first porous layer in a pore size and/or porosity.

In some embodiments, parameters of the formed porous layer, such as pore size, porosity, thickness, pore profile and/or pore shape, and thus the respective parameters of the fabricated structure may be tuned by selecting parameters of the electrochemical etching process, such as a concentration and a composition of the etching solution, applied electrical current (and potential), etching time, temperature, stirring conditions, presence and absence of illumination (and parameters of illumination, such as intensity and wavelength) as well as parameters of the etched substrate, such as the substrate's composition, the substrate's resistivity, the substrate's crystallographic orientation and the substrate's level and type of doping.

In some embodiments, the pores in the formed porous layer have a predetermined longitudinal profile, which is a profile perpendicular or substantially perpendicular to the surface of the substrate. Such longitudinal profile may be generated by varying the electrical current density during the electrochemical etching. For longitudinal pores in the porous layer, both porosity and pore size may be varied. Accordingly, in some embodiments, a profiled pore in the porous layer and in the fabricated porous substrate may have a smaller size at top, i.e. at the surface of the substrate, and a larger pores at bottom, i.e. deeper in the substrate. Yet in some embodiments, a profiled pores in the porous layer and in the fabricated porous substrate may have a larger size at the top, and a smaller size at the bottom. In some embodiments, profiled pores in the porous layer and in the fabricated substrate may also have different porosity at the top and at the bottom.

In many embodiments, the electrochemical etching may start with a pulse of a larger electrical current for a short time to prevent or reduce the formation of a nucleation layer. In some embodiments of the method, the nucleation layer may be also removed by etching the nucleation layer after the formation of the porous layer. Such etching may be performed by a dry etching technique, such as RIE. In some embodiments, appropriate steps can be taken to protect the areas underneath. For example, a photoresist may be placed on the surface, and solidified by baking, and then the plasma etch can be applied to expose a portion of the surface of the substrate that has to be etched.

For electrochemical etching, a backside of the substrate, i.e., the side of the substrate opposite to the one on which the porous layer is formed, can be coated with a conductive layer, such as a metal layer, to ensure electrical contact. Such a conductive layer may be coated using a number of techniques, including thermal evaporation and sputtering.

During the electrochemical etching, the etching solution can start pore formation through a formation of a nucleation layer, which is a surface layer of the substrate and in which pores have properties different from the desired properties of the porous layer. The nucleation layer can be characterized by irregularities of its pore properties and associated surfaces roughness, which may on a scale larger than a pore size.

In many applications, the nucleation layer on the surface of porous particles is undesirable. For example, when the silicon porous particles are used for loading smaller size particles inside them, the nucleation layer on the surface of the larger may reduce loading efficiency. In some embodiments, the nucleation layer is removed or prevented from forming. In some embodiments, during the electrochemical etching, prior to applying a current to produce the desired pores in the porous layer, a larger current may be applied to prevent the formation of the nucleation layer. Yet in some embodiments, after the formation of the porous layer, the nucleation layer may be removed by dry etching, such as RIE.

In some embodiments of the method, patterning on a surface of the substrate, e.g., using the second protective layer, can be performed using any of a number of techniques, for example, using a lithographic technique, such as photolithography, X-ray lithography, deep UV lithography, nanoimprint lithography or dip-pen lithography. In some embodiments, the photolithographic technique can be, for example, contact aligner lithography, scanner lithography, or immersion lens lithography. Using a different mask, in case of photolithography, or mold, it is possible to design structures having a number of predetermined regular, i.e. non-random shapes, such as spherical shape, square, rectangular, ellipse, disk and semi-spherical shapes. In some embodiments, patterning may be used to define lateral shape and dimensions of the particle, i.e., shape and dimensions of the particle in the cross section parallel to the surface of the substrate. When the formation of a porous layer precedes the patterning, the lateral dimensions of the fabricated structures are substantially the same as the lateral dimensions of the patterned features. When the patterning precedes the formation of a porous layer, the lateral dimensions of the fabricated structures may be larger than the lateral dimensions of the patterned features. Patterning allows one to produce structures having a predetermined regular, i.e. non-random, lateral shape. For example, in photolithographic patterning, masks of various shapes may be used to produce a desired predetermined shape, while in nanoimprint lithography, molds or stamps of various shapes may be used for the same purpose. The predetermined non-random lateral shapes for the structures are not particularly limited. For example, the structures may have circular, square, polygonal, and elliptical shapes. In some embodiments, the porous silicon structures have shapes, including but not limited to a semi-spherical, a bowl, a frustum, a pyramid, a disc, and the like.

In some embodiments, the porous silicon structures may be released from the substrate after the patterning and porous layer formation steps via electropolishing, which may involve applying a sufficiently large electrical current density to the substrate. Yet in some embodiments, the releasing of the porous silicon structures from the substrate may involve a formation of an additional porous layer, which has a larger porosity than the already formed porous layer. This higher porosity layer will be referred to as a release layer. The release layer can have a porosity large enough so that it can be easily broken when desired using, for example, mechanical techniques, such as exposing the substrate to ultrasonic energy. At the same time, the release layer can be strong enough to hold the earlier formed porous layer intact with the substrate.

Any of a number of techniques may be used to modify surface properties of the structures, i.e., surface properties of structures outside surface, and/or surface properties of structure's pores. In many embodiments, surface modification of fabricated structures may be done while the structures are still intact with the substrate before the structures are released. The type of surface modification for the structures may include, but are not limited to, chemical modification including polymer modification and oxidation; plasma treatment; metal or metal ion coating; chemical vapor deposition (CVD) coating, physical vapor deposition (PVD); atomic layer deposition (ALD); evaporation and sputtered films, and ion implantation. In some embodiments, the surface treatment is biological for biomedical targeting and controlled degradation.

Because the surface modification of the structures can be performed before the structures are released from the substrates, asymmetrical surface modification is also possible. The asymmetric surface modification means a surface modification on one side of the structures is different than that on the other side of the structures. For example, one side of the surface of the structures may be modified, while the other side of the surface of the structures may remain unmodified. For instance, pores of the structures may be fully or partially filled with a sacrificial material, such as a sacrificial photoresist. Thus, only the outer surface of the structures is being treated during the surface modification. After selective removal of the sacrificial material, only the outer surface of the structures is modified, i.e., the pore surface of the structures remains unmodified. In some embodiments, the outer surface may be patterned by, for example, photolithography, so that one part of the outer surface may have one modification, while another part of the outer surface may have another modification.

In some embodiments, the method further comprises forming porous silicon pillars by applying a current to the silicon substrate. In some embodiments, the method further comprises forming porous silicon pillars or porous silicon structures by applying a current to the silicon substrate through a solution in an electrolytic cell. In some embodiments, the current has a current density of about 1 mA/cm$^2$ to about 50 mA/cm$^2$. In some embodiments, the current has a current density of about 5 mA/cm$^2$ to about 45 mA/cm$^2$, including of about 8 mA/cm$^2$ to about 40 mA/cm$^2$, including of about 2 mA/cm$^2$ to about 40 mA/cm$^2$, including of about 10 mA/cm$^2$ to about 35 mA/cm$^2$, or including of about 5 mA/cm$^2$ to about 30 mA/cm$^2$.

In some embodiments, the method further comprises forming porous silicon structures by removing the dielectric layer. In some embodiments, the method further comprises forming porous silicon structures and separating the porous silicon structures from the silicon substrate by applying a current to the silicon substrate. In some embodiments, the current has a current density ranging from about 100 mA/cm$^2$ to about 200 mA/cm$^2$, while the silicon substrate is submerged in a fifth etch solution comprising HF.

In some embodiments, the first protective layer is deposited by chemical vapor deposition, physical vapor deposition, vacuum evaporation, sputtering or by heating the silicon substrate to a temperature of from about 800° C. to about 1,200° C. In some embodiments, the second protective layer, such as a photoresist, is deposited by spin-coating or spraying. In some embodiments, the dielectric layer is deposited by chemical vapor deposition.

In some embodiments, the first protective layer comprises silicon oxide and the first etch includes reactive ion etching under an atmosphere of $CF_4$ and/or $CHF_3$, or exposing the non-protected areas of the first protective layer to a first etching solution comprising HF, $NH_4HF$, NaF, KF, or any combination or mixture thereof. In some embodiments, the first protective layer comprises aluminum oxide and the first etch includes exposing the non-protected areas of the first protective layer to a first etching solution comprising HF, $NH_4OH$, tetra-methylammonium hydroxide, $H_3PO$, $Br_2$, or any combination or mixture thereof. In some embodiments, the first protective layer comprises chromium and the first etch includes exposing the non-protected areas of the first protective layer to a first etching solution comprising $H_2O_2$, HCl, $H_2SO_4$ and $H_2O_2$, or any combination or mixture thereof. In some embodiments, the first protective layer comprises nickel and the first etch exposing the non-protected areas of the first protective layer to a first etching solution comprising $HNO_3$, $FeCl_3$, $Ce(NH_4)_2(NO_3)_6$, HF and $H_2O_2$, $H_3PO_4$, or any combination or mixture thereof. In some embodiments, the first protective layer comprises copper and the first etch includes exposing the non-protected areas of the first protective layer to a first etching solution comprising $HNO_3$, $FeCl_3$, KCN, $H_2O_2$, or any combination or mixture thereof.

In some embodiments, the second etch comprises reactive ion etching. In some embodiments, the second etch comprises reactive ion etching under an atmosphere of $SF_6$. In some embodiments, the second etch comprises inductively coupled plasma reactive ion etching. In some embodiments, the second etch comprises inductively coupled plasma reactive ion etching under an atmosphere of $SF_6$.

In some embodiments, the third etch comprises reactive ion etching. In some embodiments, the third etch comprises reactive ion etching under an atmosphere of $CF_4$, $CHF_3$, or $SF_6$.

In some embodiments, the fourth etch includes exposing the first protective layer pillars to a fourth etching solution. In some embodiments, the first protective layer pillars comprise silicon oxide and the fourth etch solution comprises HF, $NH_4HF$, NaF, KF, or any combination or mixture thereof. In some embodiments, the first protective layer pillars comprise aluminum oxide and the fourth etch solution comprises HF, $NH_4OH$, $H_3PO$, $Br_2$, or any combination or mixture thereof. In some embodiments, the first protective layer pillars comprise chromium and the fourth etch solution comprises NaOH, $H_2O_2$, HCl, or any combination or mixture thereof. In some embodiments, the first protective layer pillars comprises nickel and the fourth etch solution comprises $HNO_3$, $FeCl_3$, $Ce(NH_4)_2(NO_3)_6$, HF, $H_3PO_4$, or any combination or mixture thereof. In some embodiments, the first protective layer pillars comprise copper and the fourth etch solution comprises $HNO_3$, $FeCl_3$, KCN, $H_2O_2$, or any combination or mixture thereof. In some embodiments, the first etching solution and the second etching solution are the same or different.

In some embodiments, the porous silicon structures have a first face, second face, and a side, wherein at least one of the first face and the second face are planar or flat. In some embodiments, the porous silicon structures have a first face, second face, and a side, wherein at least one of the first face or the second face has a longest face measurement across the first face or the second face of about 500 nm to about 5.0 micrometers, or the side has a longest side measurement across the side of about 100 nm to about 800 nm or any combination thereof.

In some embodiments, from about 30% to 100% of the porous silicon structures in a sample are characterized as having a first face, second face, and a side, wherein at least one of the first face and the second face are planar or flat. In some embodiments, from about 30% to 100% of the porous silicon structures in a sample are characterized as having a first face, second face, and a side, wherein at least one of the first face or the second face has a longest face average measurement across the first face or the second face of about 500 nm to about 5.0 micrometers, or the side has a longest side average measurement across the side of about 100 nm to about 800 nm or any combination thereof.

In general, porous silicon substrate can be bioinert, bioactive, or biodegradable depending on its porosity and pore size. Also, a rate or speed of biodegradation of porous silicon may depend on its porosity and pore size.

In some embodiments, the substrates may be a top-down fabricated substrates, i.e., substrates produced utilizing top-down microfabrication or nanofabrication technique, such as photolithography, electron beam lithography, X-ray lithography, deep UV lithography, nanoimprint lithography or dip pen nanolithography. Such fabrication methods may allow for a scaled-up production of particles that are uniform or substantially identical in dimensions.

In some embodiments, the maximum characteristic size of the porous silicon structures may be less than about 100 microns or less than about 50 microns or less than about 20 microns or less than about 10 microns or less than about 5 microns or less than about 4 microns or less than about 3 microns or less than about 2 microns or less than about 1 micron. Yet in some embodiments, the maximum characteristic size of the porous silicon structures may be from 500 nm to 3 microns or from 700 nm to 2 microns. Yet in some embodiments, the maximum characteristic size of the structures may be greater than about 2 microns or greater than about 5 microns or greater than about 10 microns.

In some embodiments, the porous silicon structures have pore size ranging from about 1 nm to about 1 micron or from about 1 nm to about 800 nm or from about 1 nm to about 500 nm or from about 1 nm to about 300 nm or from about 1 nm to about 200 nm or from about 2 nm to about 100 nm. In some embodiment, pores in the porous silicon structures may be linear pores or sponge like pores.

In some embodiments, the first porous layer may differ from the second porous layer in a pore size, i.e., a pore size of pores in the first porous layer may be larger than a pore size in the second layer or vice versa. For example, a pore size in one of the first and the second porous layer may be at least 2 times, or at least 5 times, or at least 10 times, or at least 20 times or at least 50 times, or from 2 to 50 times or from 5 to 50 times or from 2 to 20 times or from 5 to 20 times larger than a pore size in the other of the first and the second porous layer.

In many embodiments, at least one of the first and the second porous layers can be a nanoporous layer. In certain embodiments, both the first and the second porous layers can be nanoporous layers.

In some embodiments, a pore size in at least one of the first and the second porous layers may be from about 1 nm to about 1 micron, or from about 1 nm to about 800 nm, or from about 1 nm to about 500 nm, or from about 1 nm to about 300 nm, or from about 1 nm to about 200 nm, or from about 2 nm to about 100 nm.

In some embodiments, at least one of the first and the second porous layers can have an average pore size of no more than 1 micron, or no more than 800 nm, or no more than 500 nm, or no more than 300 nm, or no more than 200 nm, or no more than 100 nm, or no more than 80 nm, or no more than 50 nm. In certain embodiments, both the first and the second porous layers can have their respective average pore size of no more than 1 micron or no more than 800 nm, or more than 500 nm, or no more than 300 nm, or no more than 200 nm, or no more than 100 nm, or no more than 80 nm, or no more than 50 nm. In some embodiments, at least one of the first and the second porous layers can have an average pore size from about 10 to about 60 nm or from about 20 to about 40 nm.

In some embodiments, at least one of the first and the second porous layers can have an average pore size from about 1 nm to about 10 nm, or from about 3 nm to about 10 nm, or from about 3 nm to about 7 nm.

In some embodiments, one of the first and the second porous layers can have an average pore size from about 10 to about 60 nm, or from about 20 to about 40 nm, while the other of the first and the second porous layers can have an average pore size from about 1 nm to about 10 nm or from about 3 nm to about 10 nm or from about 3 nm to about 7 nm.

In some embodiments, pores of the first porous layer and the second porous layers may have the same or substantially the same orientation but have different average sizes.

Further Discussion of Embodiments

Embodiment 1. A method of manufacturing porous silicon structures comprising:
providing a silicon substrate having a silicon surface;
forming a first protective layer on the silicon surface, wherein the first protective layer has a protective layer surface;
depositing a second protective layer on the protective layer surface;
forming protected areas and non-protected areas on the first protective layer surface by patterning the second protective layer;
forming first protective layer pillars by performing a first etch of the non-protected areas of the first protective layer;
forming silicon pillars by performing a second etch of the silicon substrate, wherein the silicon pillars are located beneath the first protective layer pillars, wherein the silicon pillars have a silicon pillar top, a silicon pillar sidewall, a silicon pillar height, and a silicon pillar width, and wherein adjacent silicon pillar sidewalls are separated by silicon trenches having a silicon pillar spacing, covering the first protective layer pillars, the silicon pillar sidewalls, and the silicon trenches by depositing a dielectric layer;

patterning the dielectric layer by removing a portion of the dielectric layer from a top of the protective layer pillars by exposing the dielectric layer to a third etch; and removing the protective layer pillars by exposing the protective layer pillars to a fourth etch.

Embodiment 2. The method of one or more of Embodiments 1-15, further comprising:

forming porous silicon pillars by applying a current to the silicon substrate; or forming porous silicon pillars by applying a current to the silicon substrate through a solution in an electrolytic cell, wherein the current has a current density of about 1 mA/cm$^2$ to about 50 mA/cm$^2$.

Embodiment 3. The method of one or more of Embodiments 1-15, further comprising:

forming porous silicon structures by removing the dielectric layer; or forming porous silicon structures and separating the porous silicon structures from the silicon substrate by applying a current to the silicon substrate of from about 100 mA/cm$^2$ to about 200 mA/cm$^2$ while the silicon substrate is submerged in a fifth etch solution comprising HF.

Embodiment 4. The method of one or more of Embodiments 1-15, wherein the silicon surface comprises boron; or wherein the first protective layer comprises silicon oxide, aluminum oxide, chromium, nickel, copper, or any combination thereof; or wherein the second protective layer comprises a photoresist; or wherein dielectric layer comprises silicon nitride.

Embodiment 5. The method of one or more of Embodiments 1-15, wherein the first protective pillars have a protective pillar width of from about 200 nm to about 5.0 micrometers and a protective pillar height of from about 100 nm to about 600 nm; or wherein the first protective pillars have a protective pillar width of from about 600 nm to about 4.0 micrometers and a protective pillar height of from about 150 nm to about 500 nm.

Embodiment 6. The method of one or more of Embodiments 1-15, wherein the silicon pillar height is from about 2.0 micrometers to about 50.0 micrometers, the silicon pillar width is from about 200 nm to about 5.0 micrometers and the silicon pillar spacing is from about 200 nm to about 1000 nm; or wherein the silicon pillar height is from about 6.0 micrometers to about 15.0 micrometers, the silicon pillar width is from about 600 nm to about 4.0 micrometers, and the silicon pillar spacing is from about 300 nm to about 800 nm.

Embodiment 7. The method of one or more of Embodiments 1-15, wherein a ratio of the silicon pillar height to silicon pillar spacing is from about 60:1 to about 20:1; or wherein a ratio of the silicon pillar height to silicon pillar spacing is from about 55:1 to about 45:1.

Embodiment 8. The method of one or more of Embodiments 1-15, wherein the first protective layer comprises silicon oxide and the first etch includes reactive ion etching under an atmosphere of CF$_4$ and/or CHF$_3$, or exposing the non-protected areas of the first protective layer to a first etching solution comprising HF, NH$_4$HF, NaF, KF, or any combination or mixture thereof; or wherein the first protective layer comprises aluminum oxide and the first etch includes exposing the non-protected areas of the first protective layer to a first etching solution comprising HF, NH$_4$OH, tetra-methylammonium hydroxide, H$_3$PO, Br$_2$, or any combination or mixture thereof;

wherein the first protective layer comprises chromium and the first etch includes exposing the non-protected areas of the first protective layer to a first etching solution comprising H$_2$O$_2$, HCl, H$_2$SO$_4$ and H$_2$O$_2$, or any combination or mixture thereof;

wherein the first protective layer comprises nickel and the first etch exposing the non-protected areas of the first protective layer to a first etching solution comprising HNO$_3$, FeCl$_3$, Ce(NH$_4$)$_2$(NO$_3$)$_6$, HF and H$_2$O$_2$, H$_3$PO$_4$, or any combination or mixture thereof; or wherein the first protective layer comprises copper and the first etch includes exposing the non-protected areas of the first protective layer to a first etching solution comprising HNO$_3$, FeCl$_3$, KCN, H$_2$O$_2$, or any combination or mixture thereof.

Embodiment 9. The method of one or more of Embodiments 1-15, wherein the second etch comprises reactive ion etching; or wherein the second etch comprises inductively coupled plasma reactive ion etching; or wherein the second etch comprises reactive ion etching under an atmosphere of SF$_6$; or wherein the second etch comprises inductively coupled plasma reactive ion etching under an atmosphere of SF$_6$.

Embodiment 10. The method of one or more of Embodiments 1-15, wherein the third etch comprises reactive ion etching; or wherein the third etch comprises reactive ion etching under an atmosphere of CF$_4$, CHF$_3$, or SF$_6$.

Embodiment 11. The method of one or more of Embodiments 1-15, wherein the fourth etch includes exposing the first protective layer pillars to a fourth etching solution, wherein the first protective layer pillars comprise silicon oxide and the fourth etch solution comprises HF, NH$_4$HF, NaF, KF, or any combination or mixture thereof; or wherein the first protective layer pillars comprise aluminum oxide and the fourth etch solution comprises HF, NH$_4$OH, H$_3$PO, Br$_2$, or any combination or mixture thereof;

wherein the first protective layer pillars comprise chromium and the fourth etch solution comprises NaOH, H$_2$O$_2$, HCl, or any combination or mixture thereof;

wherein the first protective layer pillars comprises nickel and the fourth etch solution comprises HNO$_3$, FeCl$_3$, Ce(NH$_4$)$_2$(NO$_3$)$_6$, HF, H$_3$PO$_4$, or any combination or mixture thereof; or wherein the first protective layer pillars comprise copper and the fourth etch solution comprises HNO$_3$, FeCl$_3$, KCN, H$_2$O$_2$, or any combination or mixture thereof; or wherein the first etching solution and the second etching solution are the same or different.

Embodiment 12. The method of one or more of Embodiments 1-15, wherein the porous silicon structures have a first end, second end, and a side, wherein at least one of the first face and the second face are planar or flat; or wherein the porous silicon structures have a first end, second end, and a side, wherein at least one of the first face or the second face has a longest face measurement across the first face or the second face of about 500 nm to about 5.0 micrometers, or the side has a longest side measurement across the side of about 100 nm to about 800 nm or any combination thereof.

Embodiment 13. The method of one or more of Embodiments 1-15, wherein from about 30% to 100% of the porous silicon structures in a sample are characterized as have a first end, second end, and a side, wherein at least one of the first face and the second face are planar or flat; or wherein from about 30% to 100% of the porous silicon structures in a sample are characterized as have a first end, second end, and a side, wherein at least one of the first face or the second face has a longest face average measurement across the first face or the second face of about 500 nm to about 5.0 micrometers, or the side has a longest side average measurement across the side of about 100 nm to about 800 nm or any combination thereof.

Embodiment 14. The method of one or more of Embodiments 1-15, wherein the first protective layer is deposited by chemical vapor deposition, physical vapor deposition, vacuum evaporation, sputtering, or heating the silicon substrate to a temperature of from about 800° C. to about 1,200° C.; or wherein the second protective layer is deposited by spin-coating or spraying; or wherein the dielectric layer is deposited by chemical vapor deposition.

Examples

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices, and materials are described herein. It is to be understood that this disclosure is not limited to particular methods, and experimental conditions described, as such methods and conditions may vary.

Without further elaboration, it is believed that one skilled in the art can, using the description herein, utilize the present invention to its fullest extent. The embodiments described herein are to be construed as illustrative and not as constraining the remainder of the disclosure in any way whatsoever. While the preferred embodiments of the invention have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

For production of porous silicon particles, a heavily doped p++ type silicon wafer with a resistivity of 0.005 ohm-cm (Silicon Quest Inc., CA) is used. A first protective layer of silicon dioxide is deposited on the wafer. A second protective layer of photoresist is deposited on the first protective layer. The second protective layer is then patterned to form protected areas of the protective layer and non-protected areas. Etching (first etching) is performed on the non-protected areas of the first protective layer, by exposing the non-protected areas of the first protective layer to reactive ion etching under an atmosphere of $CF_4$ and $CHF_3$ to form first protective layer pillars.

Etching (second etching) is then performed by inductively coupled plasma reactive ion etching under the atmosphere of $SF_6$ to form silicon pillars. The second protective layer on the top of first protective layer pillars is then removed by using a piranha solution (1 volume $H_2O_2$ and 2 volumes $H_2SO_4$) and the fluorinated polymeric residual on sidewalls is cleaned in a solvent such as NMP (N-Methyl-2-pyrrolidone) or 3M® Novec™ 7200 Engineered Fluid (ethoxynonafluorobutane).

A dielectric layer of silicon nitride is then deposited over the first protective layer pillars, the silicon pillar sidewalls, and the silicon trenches. The tops of the pillars are then exposed by removing portions of the dielectric layer by RIE under an atmosphere of $SF_6$. After such removal, the dielectric layer remains intact on the sides and at the bottom of the etched areas.

The first protective layer pillars are then removed by exposing the first protective layer pillars to an etching (fourth etching) solution comprising HF. After that, the nanopores (porous silicon pillars) are formed by electrochemical etching using a mixture of hydrofluoric acid (HF) and ethanol (1:3 v/v) with applied current density of about 20 $mA/cm^2$ to form a first porous layer, which is a stable porous layer from which the particles are formed. After that, a release high porosity layer, is formed by applying the current density of 120 $mA/cm^2$, which is a release porous layer with a larger porosity than the first porous layer.

The steps of formation of a stable porous layer and formation of a release layer are then repeated a number of times to form a periodical layered or stacked porous silicon structures defining a plurality of first porous layers (i.e., porous silicon structures) separated by second porous layers. FIG. 5A and FIG. 5B illustrate exemplary SEM images of the silicon pillars. FIG. 5C and FIG. 5D illustrate exemplary SEM images of the porous silicon structures (particles) having defined shapes (flat or planar top and flat or planar bottom surfaces) and sizes.

What is claimed is:

1. A method of manufacturing porous silicon structures comprising:
   providing a silicon substrate having a silicon surface, wherein the silicon substrate is a heavily doped p++ type wafer with resistivity ranging from about 0.003 ohm-cm to about 0.007 ohm-cm;
   forming a first protective layer on the silicon surface, wherein the first protective layer has a protective layer surface, wherein the first protective layer comprises silicon oxide;
   depositing a second protective layer on the protective layer surface;
   forming protected areas and non-protected areas on the first protective layer surface by patterning the second protective layer;

forming first protective layer pillars by performing a first etch of the non-protected areas of the first protective layer;

forming silicon pillars by performing a second etch of the silicon substrate, wherein the silicon pillars are located beneath the first protective layer pillars, wherein the silicon pillars have a silicon pillar top, a silicon pillar sidewall, a silicon pillar height, and a silicon pillar width, and wherein adjacent silicon pillar sidewalls are separated by silicon trenches having a silicon pillar spacing, covering the first protective layer pillars, the silicon pillar sidewalls, and the silicon trenches by depositing a dielectric layer;

patterning the dielectric layer by removing a portion of the dielectric layer from a top of the protective layer pillars by exposing the dielectric layer to a third etch; and removing the protective layer pillars by exposing the protective layer pillars to a fourth etch.

2. The method of claim 1, further comprising:
forming porous silicon pillars by applying a current to the silicon substrate; or
forming porous silicon pillars by applying a current to the silicon substrate through a solution in an electrolytic cell, wherein the current has a current density of about 1 mA/cm$^2$ to about 50 mA/cm$^2$.

3. The method of claim 2, further comprising:
forming porous silicon structures by removing the dielectric layer; or
forming porous silicon structures and separating the porous silicon structures from the silicon substrate by applying a current to the silicon substrate of from about 100 mA/cm$^2$ to about 200 mA/cm$^2$ while the silicon substrate is submerged in a fifth etch solution comprising HF.

4. The method of claim 1, wherein the silicon surface comprises boron; or
wherein the first protective layer comprises silicon oxide, aluminum oxide, chromium, nickel, copper, or any combination thereof; or
wherein the second protective layer comprises a photoresist; or
wherein dielectric layer comprises silicon nitride.

5. The method of claim 1, wherein the first protective pillars have a protective pillar width of from about 200 nm to about 5.0 micrometers and a protective pillar height of from about 100 nm to about 600 nm; or
wherein the first protective pillars have a protective pillar width of from about 600 nm to about 4.0 micrometers and a protective pillar height of from about 150 nm to about 500 nm.

6. The method of claim 1, wherein the silicon pillar height is from about 2.0 micrometers to about 50.0 micrometers, the silicon pillar width is from about 200 nm to about 5.0 micrometers and the silicon pillar spacing is from about 200 nm to about 1000 nm; or
wherein the silicon pillar height is from about 6.0 micrometers to about 15.0 micrometers, the silicon pillar width is from about 600 nm to about 4.0 micrometers, and the silicon pillar spacing is from about 300 nm to about 800 nm.

7. The method of claim 1, wherein a ratio of the silicon pillar height to silicon pillar spacing is from about 60:1 to about 20:1; or
wherein a ratio of the silicon pillar height to silicon pillar spacing is from about 55:1 to about 45:1.

8. The method of claim 1, wherein the first protective layer comprises silicon oxide and the first etch includes reactive ion etching under an atmosphere of $CF_4$ and/or $CHF_3$, or exposing the non-protected areas of the first protective layer to a first etching solution comprising HF, $NH_4HF$, NaF, KF, or any combination or mixture thereof; or
wherein the first protective layer comprises aluminum oxide and the first etch includes exposing the non-protected areas of the first protective layer to a first etching solution comprising HF, $NH_4OH$, tetra-methylammonium hydroxide, $H_3PO$, $Br_2$, or any combination or mixture thereof; or
wherein the first protective layer comprises chromium and the first etch includes exposing the non-protected areas of the first protective layer to a first etching solution comprising $H_2O_2$, HCl, $H_2SO_4$ and $H_2O_2$, or any combination or mixture thereof; or
wherein the first protective layer comprises nickel and the first etch exposing the non-protected areas of the first protective layer to a first etching solution comprising $HNO_3$, $FeCl_3$, $Ce(NH_4)_2(NO_3)_6$, HF and $H_2O_2$, $H_3PO_4$, or any combination or mixture thereof; or
wherein the first protective layer comprises copper and the first etch includes exposing the non-protected areas of the first protective layer to a first etching solution comprising $HNO_3$, $FeCl_3$, KCN, $H_2O_2$, or any combination or mixture thereof.

9. The method of claim 1, wherein the second etch comprises reactive ion etching; or wherein the second etch comprises inductively coupled plasma reactive ion etching; or
wherein the second etch comprises reactive ion etching under an atmosphere of $SF_6$; or
wherein the second etch comprises inductively coupled plasma reactive ion etching under an atmosphere of $SF_6$.

10. The method of claim 1, wherein the third etch comprises reactive ion etching; or wherein the third etch comprises reactive ion etching under an atmosphere of $CF_4$, $CHF_3$, or $SF_6$.

11. The method of claim 1, wherein the fourth etch includes exposing the first protective layer pillars to a fourth etching solution,
wherein the first protective layer pillars comprise silicon oxide and the fourth etch solution comprises HF, $NH_4HF$, NaF, KF, or any combination or mixture thereof, or
wherein the first protective layer pillars comprise aluminum oxide and the fourth etch solution comprises HF, $NH_4OH$, $H_3PO$, $Br_2$, or any combination or mixture thereof; or
wherein the first protective layer pillars comprise chromium and the fourth etch solution comprises NaOH, $H_2O_2$, HCl, or any combination or mixture thereof; or
wherein the first protective layer pillars comprises nickel and the fourth etch solution comprises $HNO_3$, $FeCl_3$, $Ce(NH_4)_2(NO_3)_6$, HF, $H_3PO_4$, or any combination or mixture thereof; or
wherein the first protective layer pillars comprise copper and the fourth etch solution comprises $HNO_3$, $FeCl_3$, KCN, $H_2O_2$, or any combination or mixture thereof; or
wherein the first etching solution and the second etching solution are the same or different.

12. The method of claim 3, wherein the porous silicon structures have a first end, second end, and a side, wherein at least one of the first face and the second face are planar or flat; or wherein the porous silicon structures have a first end, second end, and a side, wherein at least one of the first face or the second face has a longest face measurement across the first face or the second face of about 500 nm to about 5.0 micrometers, or the side has a longest side measurement across the side of about 100 nm to about 800 nm or any combination thereof.

13. The method of claim 3, wherein from about 30% to 100% of the porous silicon structures in a sample are characterized as have a first end, second end, and a side, wherein at least one of the first face and the second face are planar or flat; or
   wherein from about 30% to 100% of the porous silicon structures in a sample are characterized as have a first end, second end, and a side, wherein at least one of the first face or the second face has a longest face average measurement across the first face or the second face of about 500 nm to about 5.0 micrometers, or the side has a longest side average measurement across the side of about 100 nm to about 800 nm or any combination thereof.

14. The method of claim 1, wherein the first protective layer is deposited by chemical vapor deposition, physical vapor deposition, vacuum evaporation, sputtering, or heating the silicon substrate to a temperature of from about 800° C. to about 1,200° C.; or
   wherein the second protective layer is deposited by spin-coating or spraying; or
   wherein the dielectric layer is deposited by chemical vapor deposition.

15. The method of claim 1, wherein the fourth etch removes the protective layer pillars without causing distortion to the silicon pillar top.

16. The method of claim 3, wherein the porous silicon structures are formed without deformation of their shapes, sizes, or structural integrity.

17. A method of manufacturing porous silicon structures comprising:
   providing a silicon substrate having a silicon surface, wherein the silicon substrate is a heavily doped $p^{++}$ type wafer with resistivity ranging from about 0.003 ohm-cm to about 0.007 ohm-cm;
   forming a first protective layer on the silicon surface, wherein the first protective layer has a protective layer surface, wherein the first protective layer comprises silicon oxide;
   depositing a second protective layer on the protective layer surface;
   forming protected areas and non-protected areas on the first protective layer surface by patterning the second protective layer;
   forming first protective layer pillars by performing a first etch of the non-protected areas of the first protective layer;
   forming silicon pillars by performing a second etch of the silicon substrate, wherein the silicon pillars are located beneath the first protective layer pillars, wherein the silicon pillars have a silicon pillar top, a silicon pillar sidewall, a silicon pillar height, and a silicon pillar width, and wherein adjacent silicon pillar sidewalls are separated by silicon trenches having a silicon pillar spacing,
   covering the first protective layer pillars, the silicon pillar sidewalls, and the silicon trenches by depositing a dielectric layer;
   patterning the dielectric layer by removing a portion of the dielectric layer from a top of the protective layer pillars by exposing the dielectric layer to a third etch; and
   removing the first protective layer pillars by exposing the protective layer pillars to a fourth etch;
   wherein the third etch comprises reactive ion etching under an atmosphere of $CF_4$, $CHF_3$, or $SF_6$; and
   wherein a ratio of the silicon pillar height to silicon pillar spacing is from about 60:1 to about 20:1.

18. The method of claim 17,
   wherein the first protective pillars have a protective pillar width of from about 200 nm to about 5.0 micrometers and a protective pillar height of from about 100 nm to about 600 nm;
   wherein the silicon pillar height is from about 2.0 micrometers to about 50.0 micrometers, the silicon pillar width is from about 200 nm to about 5.0 micrometers and the silicon pillar spacing is from about 200 nm to about 1000 nm; and
   wherein the second etch comprises reactive ion etching under an atmosphere of $SF_6$.

* * * * *